United States Patent Office 3,211,354
Patented Oct. 12, 1965

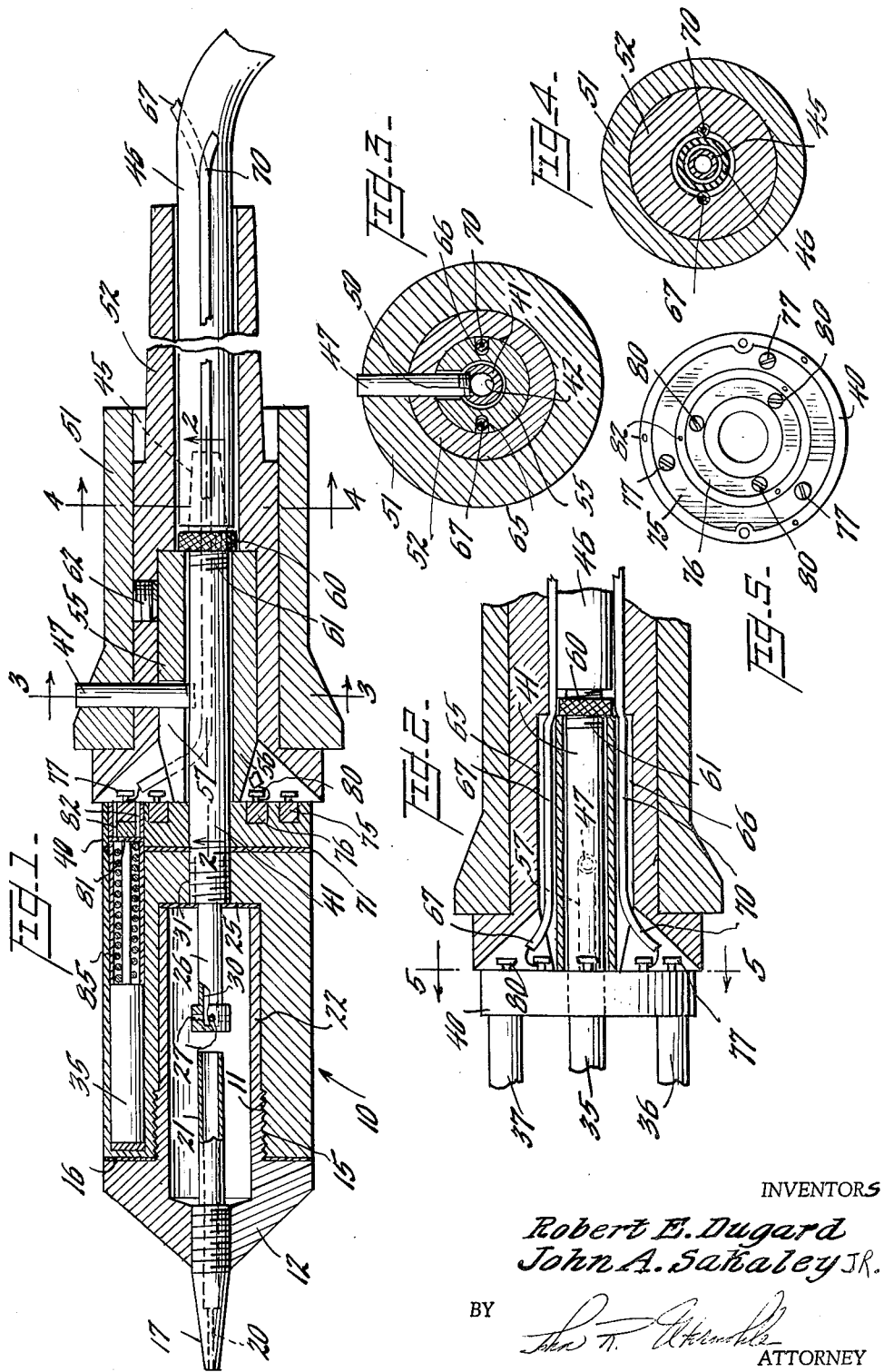

3,211,354
APPARATUS FOR DESOLDERING
Robert Evers Dugard, 2203 Muskogee Road, Adelphi, Md., and John Andrew Sakaley, Jr., Apt. 101, 4313 Wheeler Road SE., Washington, D.C.
Filed Apr. 13, 1962, Ser. No. 187,445
1 Claim. (Cl. 228—20)
(Granted under Title 35, U.S. Code (1952), sec. 266)

The invention described herein may be manufactured and used by or for the Government for governmental purposes without the payment to us of any royalty thereon.

This invention relates to apparatus for desoldering, and more particularly to apparatus for removing solder from extremely small electrical connections.

For many years, the trend in the electronic industry has been toward miniaturization. In the radio and television industry, this trend is obvious since manufacturers are constantly attempting to reduce the size of their equipment further. This trend is even more remarkable in what may be termed the computer industry. Computers which perform various electronic functions contain hundreds of thousands of components. Since many of these components are identical, the tendency has been to solder scores or even hundreds of such components on a single insulated sheet called a printed wire board. In most cases, the individual size of such components is extremely small, and when many such components are mounted on one board and very close together, extreme mounting problems are presented.

To overcome these problems, many small soldering irons have been devised for soldering component leads to the boards. Also, in order to remove the solder securing these small components to the boards, other soldering devices have been devised heretofore for removing such solder by some suction apparatus. Basically, such apparatus includes means for melting the solder and means for applying a negative pressure to the solder joint to remove the solder therefrom. In all such solder and desoldering apparatus devised heretofore, there has been at least one defect. This concerns the fact that the various apertures in desoldering apparatuses of the prior art, during a desoldering operation, become clogged due to the fact that solder, when it is melted and allowed to cool, oxidizes and becomes pulverant. Since such devices are generally used for extremely small components and since various channels and apertures therein are themselves small in diameter, the powdery, cooled solder generally clogs such apertures after a short operating time.

It is an object of the present invention to provide a new and improved apparatus for desoldering.

It is an other object of the invention to provide a new and improved apparatus for removing solder from extremely small electrical connections.

It is a further object of the invention to provide a new and improved apparatus for desoldering wherein, during the desoldering operation, no clogging of the apparatus is caused by pulverant, oxidized solder.

With these and other objects in view, an apparatus for desoldering, of the type wherein a soldering device has a heated tip portion with an aperture therethrough which communicates with a chamber into which the solder that is melted by the tip portion is drawn by a suction means, illustrating certain features of the invention, may include means for maintaining the temperature of the chamber sufficiently high to maintain the solder that is drawn thereinto in a molten condition.

A complete understanding of the invention may be had from the following detailed description of an apparatus forming specific embodiments thereof, when read in conjunction with the appended drawings, in which:

FIG. 1 is a cross section of a side elevation showing a desoldering device according to the invention, which may also be used for soldering;

FIG. 2 is a cross sectional side elevation of a portion of the apparatus shown in FIG. 1;

FIG. 3 is a section taken along the line 3—3 of FIG. 1;

FIG. 4 is a section taken along the line 4—4 of FIG. 1; and

FIG. 5 is a section taken along the line 5—5 of FIG. 2.

Referring now to the drawings, and more particularly to FIG. 1, one embodiment of a soldering and desoldering apparatus embodying the invention is shown therein. The forward portion of the apparatus includes a housing 10 having a threaded portion 11 formed therein. A head 12, having a threaded portion 15 formed thereon, is threaded to the housing 10, and a seal 16 of suitable insulation material is placed therebetween. In the extreme forward end of the head 12, a tip 17 is threaded in the manner shown in FIG. 1. The tip 17 is tubular in form and includes a longitudinal channel 20 which extends therethrough. As shown in FIG. 1, the forward end of the tip 17 is tapered, and the rearward end thereof, shaped in the form of a tube 21, extends about half-way into the interior of the housing 10.

As also shown in FIG. 1, the head 12 includes a tubular portion 22 which is integral with and projects from the rear thereof and which extends within the complete interior of the housing 10, and a seal 25 of suitable insulation material is placed therebetween. Also located within the housing 10 is a tubular insert 26 having transverse apertures 27—27 formed near the forward end thereof. A longitudinal channel 30 is also formed through the insert 26, and a threaded portion 31 is provided for securing the insert 26 within the rearward end of the housing 10. Also embedded within the housing 10 are three heating elements 35, 36 and 37, the element 35 being shown in partial cross section in FIG. 1, and all such elements being shown partially in FIG. 2. These heating elements are spaced equally around the circular housing 10 and are embedded within a connector plate 40 as will be described more fully hereinbelow.

As stated above, the tip 17 has a longitudinal channel 20 formed therein, and the insert 26 has the apertures 27—27 and the longitudinal channel 30 formed therethrough. These passageways are provided in order to connect a source of negative pressure to the tip 17 and to apply such a negative pressure at the forward end thereof. Consequently, in order to connect a vacuum pump or the like to the tip 17 to provide this negative pressure, the threaded portion 31 of the insert 26 is secured to a tube 41 having a longitudinal channel 42 (FIG. 3) extending therethrough. The tube 41 is provided with a tapered end portion 45 to which a flexible rubber or plastic tubing 46 may be connected. The tubing 46 extends from the rearward portion of the device and is then connected to a suitable vacuum pump to apply the required negative pressure at the forward end of the tip 17.

As shown in FIGS. 1 and 3, a vent 47, having a threaded portion 50 thereon, is secured to the side of the tube 41 and transversely thereof. Normally, when the vacuum pump connected to the tubing 46 is in operation, air will pass through the vent 47, the rearward end of the tube 41 and the flexible tubing 46 to the pump. Then, when the thumb is placed over the upper end of the vent 47, air will pass through the channel 20 in the tip 17, the tube 21 of the tip 17, the tubular portion 22 of the head 12, the apertures 27—27 of the insert 26, the channel 30 thereof and to the pump. In this manner, negative pressure can be applied to the forward end of the tip 17 and removed therefrom when desired.

To hold all parts securely in place, a handle is provided which is made in two parts, a forward, outer portion 51 and a rearward, inner portion 52. A spacer 55, generally cylindrical in shape but having a tapered forward end 56 is inserted around the tube 41. The spacer 55 has a U-shaped portion 57 (as viewed in plan in FIG. 2) removed from the forward end thereof to permit passage of the vent 47, and an exposed side thereof is shown in the cross sectional view of FIG. 1. When the spacer 55 is placed around the tube 41, it is secured thereon by a nut 60 which cooperates with a threaded portion 61 on the tube 41. The inner portion 52 of the handle is then placed around the spacer 55 and secured thereto by a set screw 62. The outer portion 51 of the handle is then placed around the inner portion 52 thereof, and the vent 47 is screwed into the side of the tube 41, as shown in FIG. 1. With this structure, all parts are held securely in place.

As shown in FIGS. 2 and 3, the spacer 55 also has two oppositely disposed longitudinal portions 65 and 66 removed therefrom. These portions are provided to permit two electrical conductors 67 and 70 to pass therethrough between the spacer 55 and the inner portion 52 of the handle. As shown in FIG. 1, the rearward section of the inner portion 52 of the handle is sufficiently large in diameter to receive the flexible tubing 46 and the conductors 67 and 70. The ends of the conductors 67 and 70, which are without the handle, are connected to a suitable source of electrical potential (not shown). The opposite ends thereof are connected, as shown in FIGS. 1 and 5, to the connector plate 40.

The connector plate 40 is located between the housing 10 and the spacer 55. A seal 71 of suitable insulation material is provided between the housing 10 and the connector plate 40, and the plate 40 is held securely in position since the nut 60 forces the spacer 55 thereagainst. Embedded within the right-hand side of the connector plate 40, as viewed in FIG. 1, are two circular rings 75 and 76 of conductive material. Three screws 77—77 are threaded into the outer conductive ring 75, and three screws 80—80 are threaded to the inner conductive ring 76. Consequently, when the conductor 70 is connected to one of the screws 77—77, the plus side of the electrical source is applied to the outer conductive ring 75, and when the conductor 67 is connected to one of the screws 80—80, the negative side of the source is connected to the inner conductor ring 76.

On the side of the connector plate 40 opposite the conductive rings 75 and 76 (the left-hand side as shown in FIG. 1), three circular wells are counterbored therein. One of these wells is shown in FIG. 1 and designated by the numeral 81. Two apertures 82—82 (FIGS. 1 and 5) are formed through the connector plate 40 within the bottom of the well 81. The heating element 35 is secured, by a press fit, into the well 81, and two leads from the ends of a heating coil 85 within the element 35 are passed through the apertures 82—82. One of the leads is connected to the screw 77 nearest to the apertures 82—82, and the other to the nearest screw 80. The same structure is provided to energize the heating elements 36 and 37 as can be seen in FIG. 5. As shown therein, adjacent to each of the closely spaced screws 77 and 80 is a pair of apertures through which wires from the heating coils within the elements 36 and 37 are passed. In this manner, the single pair of input conductors 67 and 70 connects the electrical source across the rings 75 and 76, and since leads from each of the heating elements are also connected across these rings, operating potential is applied to all heating elements.

In operation, the tubing 46 is connected to operating a vacuum pump (not shown) which may be operating continually or energized when needed, and the conductors 67 and 70 are energized with a potential that is suitable to heat the heating elements 35, 36 and 37. With nothing covering the upper end of the vent 47, air will pass through the vent 47, the rearward end of the tube 41 and the flexible tubing 46 to the vacuum pump, as described above. In this manner, the apparatus shown in the drawings can be used as a soldering device in the normal manner. Then, in order to use the device for desoldering purposes, the tip 17 is placed on the area to be desoldered, and the heat from the elements 35, 36 and 37 raises the temperature of the housing 10, the head 12 and the tip 17 a sufficient amount to melt the solder.

When the solder to be removed from the joint is in a molten condition, the operator presses his thumb over the vent 47 to place a negative pressure at the forward end of the tip 17 in the manner described hereinabove. The molten solder is then pulled into the inner, longitudinal channel 20 of the tip 17 and the tube 21 by suction and impinges upon the flat, forward end of the insert 26, falling into the interior of the housing 10. Since the heating elements 35, 36 and 37 surround the housing, they are designed to keep the housing at a sufficiently high temperature to maintain the solder therein in a molten condition. Because of the small size and location of the transverse apertures 27—27 within the insert 26, none of the solder will pass through the insert 26 and the flexible tubing 46 to the pump. It might be mentioned that if the device is shaken violently, some solder may make its way through the apertures 27—27 and into the tubing 46. Therefore, as a safety measure, a suitable filter (not shown) may be provided within the flexible tubing 46 to prevent any molten solder from entering the vacuum pump.

As mentioned hereinabove, desoldering devices have been devised heretofore to draw molten solder from a soldered joint into some form of solder trap. However, as pointed out, in all cases the solder is cooled on the way to the trap so that the cooled solder oxidizes and becomes pulverant. As a result, the various small apertures within the prior art desoldering devices become clogged with powdered, oxidized solder after an extremely short operating time. With the device and the method of the present invention, the solder that is removed from a soldered joint during a desoldering operation is retained within the housing 10 in a molten condition, thereby preventing the cooling and the oxidation of the solder. Therefore, with the present device, the solder does not become pulverant and clog the various apertures within the desoldering device. Obviously, then, no clogging of such apertures occurs with the present device, and it may be used over extremely long periods of time to remove solder from extremely small solder joints before the interior of the housing 10 becomes sufficiently filled with molten solder to require its removal. Such removal is accomplished simply by unscrewing the head 12 from the housing 10 and permitting the solder to flow therefrom.

It is to be understood that the above-described embodiment of the invention is simply illustrative of the principles thereof and that numerous modifications and embodiments of the invention may be devised within this spirit and scope thereof.

What is claimed is:

An apparatus for desoldering, which comprises a housing having a tubular chamber formed therein, a tip having a passage formed therethrough secured to the housing, a tubular extension on the tip which is substantially smaller in diameter than the inner diameter of the chamber and the inner end of which projects a substantial distance into the chamber such that the passage communicates with the chamber, heating means embedded within the housing for raising the temperature of the housing and the tip sufficiently to melt solder, a tubular member secured to the housing and having a passageway communicating with the chamber, a vacuum pump connected to the tubular member, a venting tube connected to the tubular member to provide a bypass for the chamber and the tip, the sealing off of the venting tube causing the vacuum pump to place a negative pressure at the tip so that any solder melted thereby is drawn within the passageway in the tip and into the chamber where the heating means maintains it in a molten condition, and baffle means secured within the chamber for preventing molten solder from being drawn through the chamber and into the passageway of the tubular member.

References Cited by the Examiner
UNITED STATES PATENTS

| | | | |
|---|---|---|---|
| 1,140,660 | 5/15 | Brizius. | |
| 1,189,735 | 7/16 | Quintin. | |
| 2,566,011 | 8/51 | Williams. | |
| 2,609,778 | 9/52 | Bleam et al. | 113—105 |
| 2,636,408 | 4/53 | Mitchell | 29—426 |
| 2,826,667 | 3/58 | Brillinger | 219—21 |
| 2,827,405 | 3/58 | Evans et al. | 29—426 |
| 2,960,591 | 11/60 | Brillinger. | |
| 3,045,095 | 7/62 | Usher et al. | |

JOHN F. CAMPBELL, *Primary Examiner.*